United States Patent [19]
Morokuma

[11] Patent Number: 5,369,488
[45] Date of Patent: Nov. 29, 1994

[54] HIGH PRECISION LOCATION MEASURING DEVICE WHEREIN A POSITION DETECTOR AND AN INTERFEROMETER ARE FIXED TO A MOVABLE HOLDER

[75] Inventor: Tadashi Morokuma, Tokyo, Japan

[73] Assignee: Olympus Optical Co., Ltd., Tokyo, Japan

[21] Appl. No.: 986,787

[22] Filed: Dec. 8, 1992

[30] Foreign Application Priority Data

Dec. 10, 1991 [JP] Japan ................................. 3-325920
Dec. 26, 1991 [JP] Japan ................................. 3-344782
Dec. 26, 1991 [JP] Japan ................................. 3-344784

[51] Int. Cl.⁵ ............................................. G01B 9/02
[52] U.S. Cl. ................................... 356/358; 356/363
[58] Field of Search ............... 356/357, 358, 363, 359, 356/360

[56] References Cited

U.S. PATENT DOCUMENTS 4,984,891 1/1991 Miyazaki et al. ................... 356/358

FOREIGN PATENT DOCUMENTS 57-923 1/1982 Japan .

*Primary Examiner*—Samuel A. Turner
*Assistant Examiner*—Robert Kim
*Attorney, Agent, or Firm*—Cushman Darby & Cushman

[57] ABSTRACT

A high precision coordinate measuring device comprising a reflecting mirror fixed to a base, a movable holder displaceable in a direction perpendicular to the reflecting mirror, a position detector mounted on the movable holder and an interferometer for detecting a displacement of the position detector relative to the reflecting mirror. The interferometer has a measuring optical system and a reference optical system. This coordinate measuring device uses movable members light in weights thereof and permits performing measurements of lengths with high precision free from Abbe's error.

18 Claims, 10 Drawing Sheets

HIGH PRECISION LOCATION MEASURING DEVICE WHEREIN A POSITION DETECTOR AND AN INTERFEROMETER ARE FIXED TO A MOVABLE HOLDER

BACKGROUND OF THE INVENTION a) Field of the Invention

The present invention relates to a high precision coordinate measuring device utilizing interference of laser light.

b) Description of the Prior Art

First, description will be made, with reference to FIG. 1, of a two-dimensional coordinate measuring device utilizing interference of laser light which is configured on the basis of the prior art. Rectangular reflecting mirrors Mx and My are fixed to a stage 1 which is displaceable in an X direction and a Y direction. These reflecting mirrors are disposed so as to be perpendicular to measuring arms of an X axis measuring laser interferometer (hereinafter referred to as an X interferometer) Ix and a Y axis measuring laser interferometer (hereinafter referred to as a Y interferometer) Iy respectively. The X interferometer Ix measures a displacement in the X direction when the stage 1 is displaced in the X direction, whereas the Y interferometer Iy measures a displacement in the Y direction when the stage 1 is displaced in the Y direction. The reference numeral 2 represents a position detector such as a position detecting microscope which detects locations of points on a FIG. 3a traced on an object to be measured 3. Optical axes of the X interferometer Ix, Y interferometer Iy and the position detector are perpendicular to one another and intersect at a point. When the interferometers and the position detector are disposed as described above, Abbe's condition is satisfied and, even if the stage 1 is slightly inclined around the X axis and/or the Y axis, measuring errors proportional to an angle of the inclination (Abbe's errors) are not produced. In this example, however, the stage 1 which is heavy and mounts the object 3 must be displaced, thereby bending a base (not shown) to which the X interferometer Ix, the Y interferometer Iy and the position detector 2 are fixed when the base does not have sufficient rigidity. As a result, distances from the interferometers to the reflecting mirrors are changed, thereby constituting a cause of measuring errors. For obtaining a high measuring accuracy on the order of 1 nanometer, it is therefore necessary to enhance rigidity of the base, which results in enlarging the measuring device and increasing a weight of the measuring device. Accordingly, a key point for enhancing the measuring accuracy lies in making weights of moving members as light as possible.

FIG. 2 is a conceptional diagram of a three-dimensional coordinate measuring device which comprises, in addition to the members of the two-dimensional coordinate measuring device shown in FIG. 1, a Z axis measuring laser interferometer Iz, or a Z interferometer Iz, and a reflecting mirror Mz disposed under the stage 1 which is configured so as to be displaceable in three X, Y and Z directions. The object 3a has a three-dimensional form. In this example also, the heavy stage 1 must be displaced and measuring errors due to the bending of the base are inevitable. A method to reduce the weights of the moving members is to dispose the interferometers Ix, Iy and Iz inside the reflecting mirrors Mx, My and Mz respectively in place of the stage 1, and integrate the interferometers with the position detector 2 so as to form a movable member. When the interferometers are disposed near the position detector, however, the interferometers strike against the object to be measured. When the optical axes of the interferometers are made higher for avoiding this striking, Abbe's condition cannot be satisfied. This inconvenience is caused also in the case of the two-dimensional coordinate measuring device.

It is said that a very high measuring accuracy on the order of 1 nanometer can be obtained with a length measuring system which utilizes interference of light. However, it is impossible to obtain the high measuring accuracy inherent in the interferometers without considering overall performance of the measuring system as a whole including the position detector. Further, the conventional coordinate measuring devices in which the heavy stages must be displaced in two directions require rigid bases which cannot be bent and inevitably have large dimensions. Furthermore, there has been unknown any means which permits measuring three-dimensional objects with high precision.

SUMMARY OF THE INVENTION

A primary object of the present invention is to provide coordinate measuring devices, including one-dimensional coordinate or length measuring device which permit obtaining the high measuring accuracy inherent in the interferometers by reducing weight of the moving members.

The high precision coordinate measuring device according to the present invention comprises a base, at least one reflecting mirror fixed on the base, movable holder displaceable in direction perpendicular to the reflecting mirror, a position detector fixed to the movable holder, and at least one which is fixed to the movable holder and used for measuring displacement of the holder relative to the reflecting mirror.

In a preferred formation of the present invention, an interferometer optical system is fixed at a distance of 2 f from a paint to be measured on an object. The reference symbol f represents a focal length of an objective lens of the position detector such as a position detecting microscope.

The present invention makes it possible to perform high precision coordinate measurements while preventing Abbe's errors which are caused due to inclination of the movable holder.

In another preferred formation of the present invention, the coordinate measuring device comprises a first interferometer and a second interferometer each of which has a measuring optical system and a reference optical system, the measuring optical systems of the first and the second interferometers have optical axes which are located at distances of L and D respectively ($L \neq D$) a point to be measured detected by the position detector (hereinafter referred to as a measuring point) from, and the coordinate measuring device is configured so as to calculate a displacement S of the measuring point as:

$$(d_2 - md_1)/(1-m)$$

wherein the reference symbols $d_1$ and $d_2$ represent displacements of the movable holder measured by the first interferometer and the second interferometer respectively, and the reference symbol m designates $L/D$.

The coordinate measuring device according to the present invention allows measuring errors to be hardly produced since the measuring device adopts the movable holder which is equipped with the position detector and displaced in place of the stage, and uses moving members having reduced weights. Further, the coordinate measuring device according to the present invention uses the two interferometers which are disposed at different heights as measured from the measuring point, and is configured so as to calculate a displacement distance on the basis of interference fringe data measured with the interferometers and using parameters including locations of the interferometers as measured from the measuring point, thereby eliminating Abbe's errors due to inclinations of the movable holder and assuring high precision coordinate measurements.

In a further preferred formation of the present invention, a measuring optical path is formed so as to allow a light beam to reciprocally travel N times (N: an integer of 2 or larger) between the measuring optical system and the reflecting mirror, and a reference optical path is formed so as to allow a light beam to reciprocally travel M times (M: an integer smaller than N) between the reference optical system and the reflecting mirror. Positional relationship between the measuring optical system and the reference optical system is set so as to satisfy a condition of:

$$NP=MQ$$

wherein the reference symbol P represents a distance from the measuring point to the optical axis of the measuring optical system and the reference symbol Q designates a distance from the measuring point to the optical axis of the reference optical system.

The coordinate measuring device according to the present invention can be modified so that the interferometers are fixed to the base and the reflecting mirrors are fixed to the movable holder to satisfy by the condition of NP=MQ. In any formations described above, Abbe's errors are eliminated since a variation of difference in the optical path is the same between the measuring optical system and the reference optical system when the movable holder is inclined around the measuring point.

This and other objects as well as the features and the advantages of the present invention will become apparent from the following detailed description of the preferred embodiments when taken in conjunction with the accompanying drawings.

BRIEF DESCRIPTION OF THE DRAWINGS

FIG. 10 is a diagram illustrating a configuration of a fourth embodiment of the high precision coordinate measuring device according to the present invention;

FIG. 11 is a diagram descriptive of optical paths of interferometers used in the fourth embodiment of the present invention;

FIG. 12 is a diagram descriptive of different optical paths of the interferometers used in the fourth embodiment of the present invention;

DESCRIPTION OF THE PREFERRED EMBODIMENTS

Figure 1:
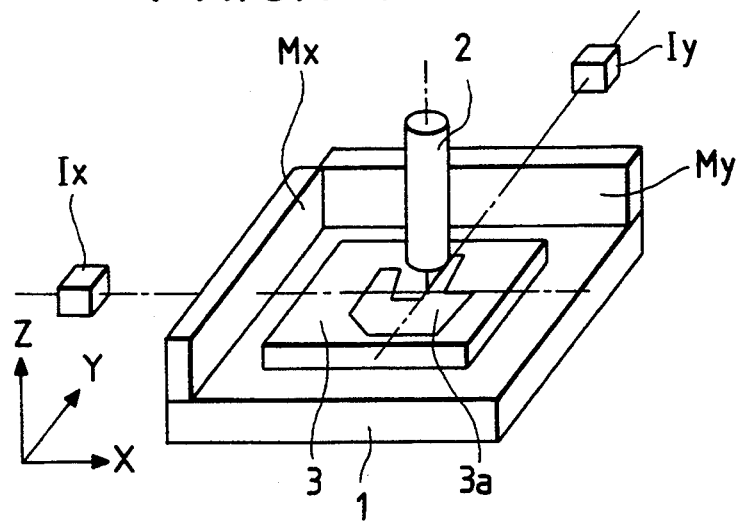
FIG. 1 is a schematic diagram of the conventional two-dimensional coordinate measuring device utilizing laser interferometers.
Figure 2:
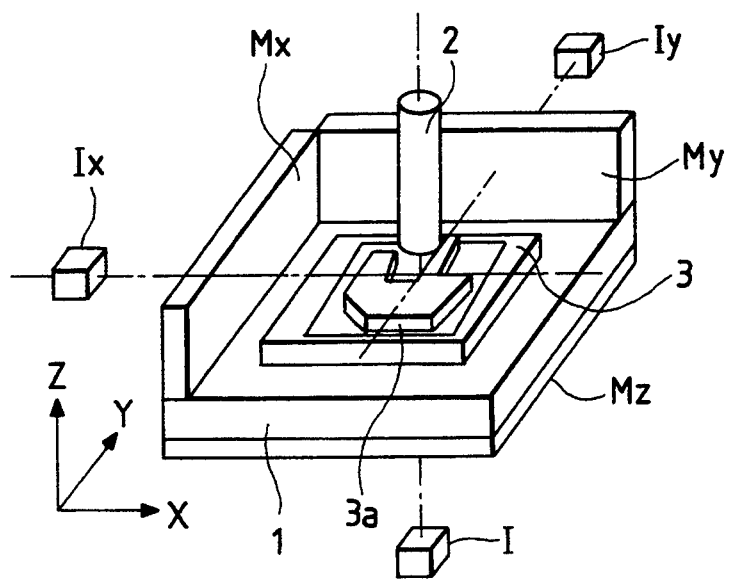
FIG. 2 is a schematic diagram illustrating the conventional three-dimensional coordinate measuring device utilizing the laser interferometers.
Figure 3:
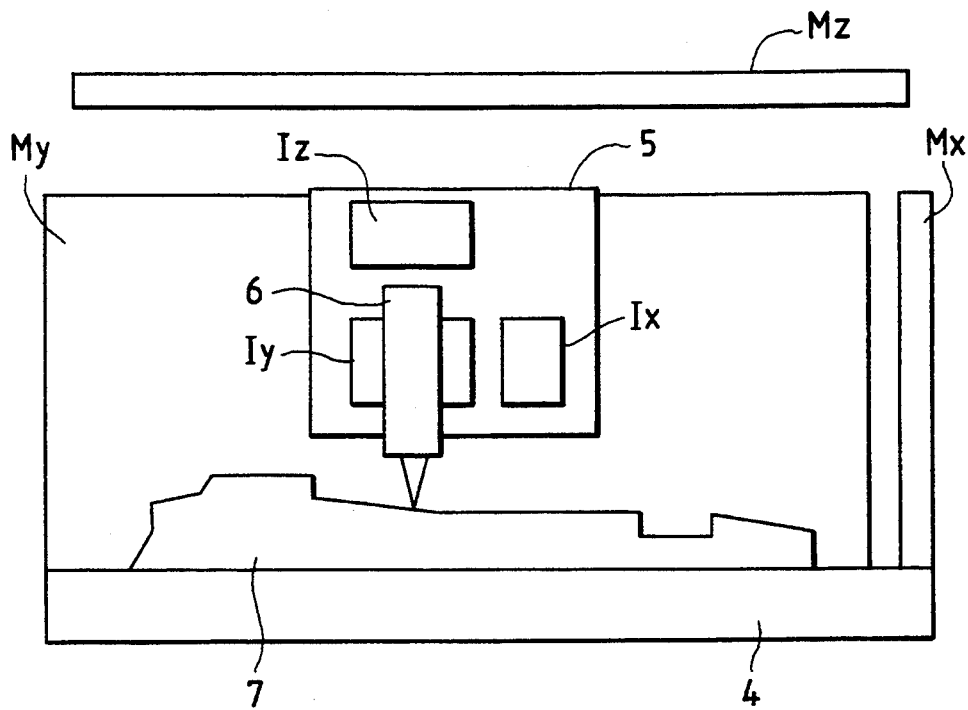
FIG. 3 is a schematic diagram illustrating a first embodiment of the high precision coordinate measuring device according to the present invention.

The first embodiment of the high precision coordinate measuring device according to the present invention will be described first with reference to FIG. 3 through FIG. 5. FIG. 3 schematically shows a configuration of the coordinate measuring device which measures an object in three dimensions. On a base 4, planar reflecting mirrors Mx, My and Mz are fixed by adequate means (not shown). Attached to a movable holder 5 are a position detector 6, an X interferometer Ix, a Y interferometer Iy and a Z interferometer Iz. The holder 5 is composed so as to be movable in X, Y and Z directions with a known three-dimensional driving mechanism (not shown). Locations on a surface of an object to be measured 7 which is placed on the base 4 are detected with the position detector 6.

Figure 4:
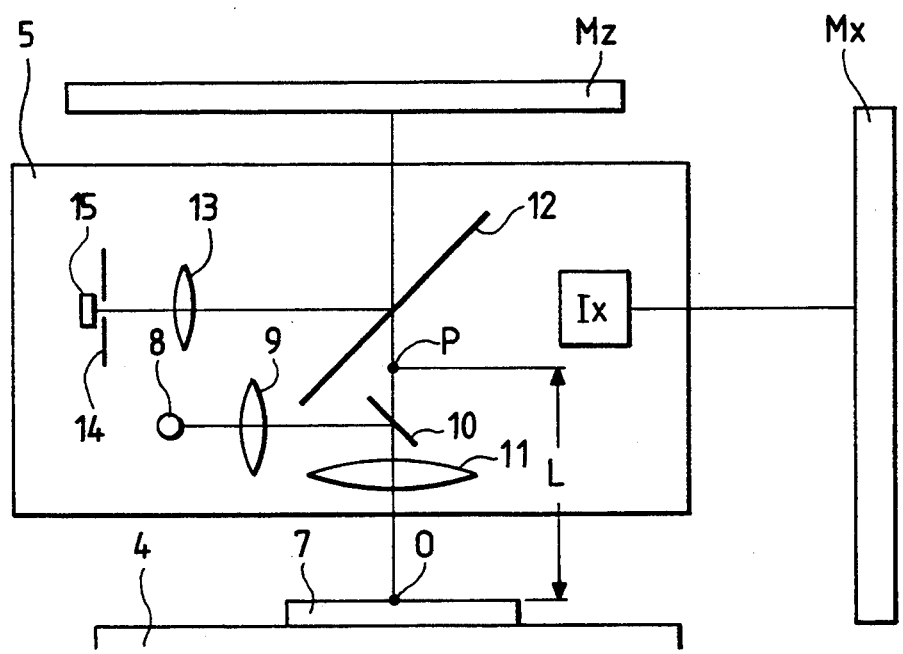
FIG. 4 is a diagram illustrating a configuration of the first embodiment of the present invention.
Figure 5:
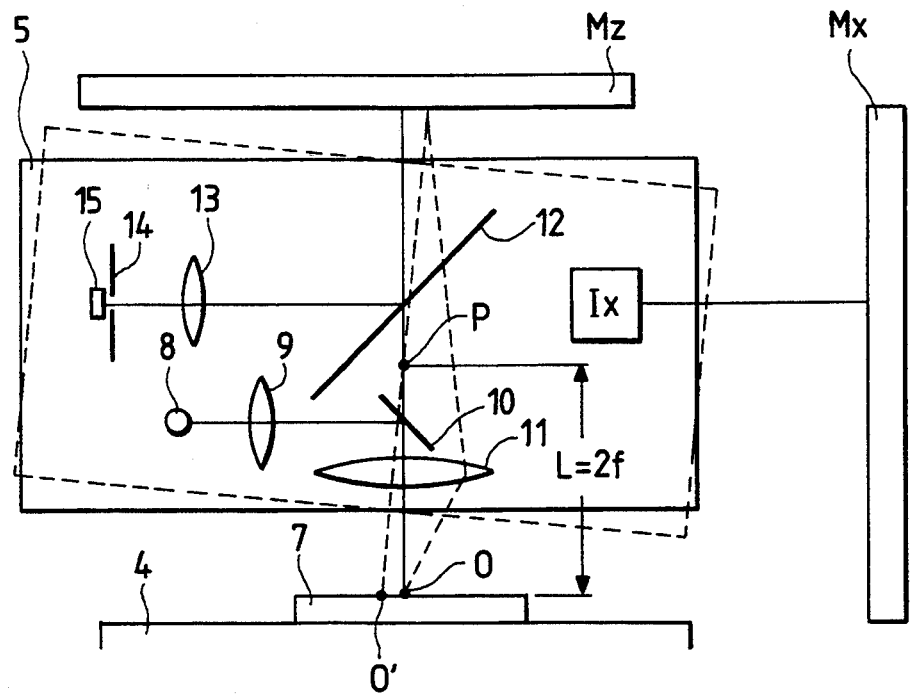
FIG. 5 is a diagram similar to FIG. 4 illustrating an inclined condition of the movable holder.

A method to eliminate Abbe's errors will be described, as an example, with reference to FIG. 4 and FIG. 5. illustrated in FIG. 4 and FIG. 5 is a layout of optical paths in the position detector 6 which is fixed to the movable holder 5. In these drawings, the reference numeral 8 represents a light source for illuminating the object to be measured 7, the reference numeral 9 designates a lens for illumination and the reference numeral 10 denotes a half mirror for illumination. When an objective lens 11 is brought into focus on the surface of the object 7, a light beam reflected from a point O on the object 7 is made into a parallel beam by the objective lens 11, is allowed to pass through the half mirror 10 and another half mirror 12, reflected by the reflecting mirror Mz and reaches again to the half mirror 12. The light beam is reflected by the half mirror 12 and focused by an eyepiece lens 13 onto a location of a pinhole 14. A photodetector 15 detects an intensity of the light beam which has passed through the pinhole 14.

Let us now assume a case wherein the movable holder 5 is rotated clockwise around a straight line passing through a point P which is located on the optical axis, apart from the object 7 for a distance of L and in parallel with the Y axis (perpendicular to the paper surface in the drawings). The rotated position of the movable holder 5 is illustrated in dashed lines in FIG. 5. Let us assume that the movable holder 5 is rotated at an angle of α and the objective lens 11 has a focal length of f. Before the rotation of the movable holder 5, the light beam reflected from the point O passes through the pinhole 14. In a case where the reflecting mirror Mz is rotated together with the movable holder 5, a light beam reflected from a point O′ which is located at a distance of Lα as measured leftward from the point O passes through the pinhole 14. Since the reflecting mirror Mz is not rotated actually together with the movable holder 5, a light beam reflected from a point which is located at a distance of 2 fα as measured rightward from the point O′ passes through the pinhole 14. Accordingly, a condition required for detecting the location of the point O is that the point located rightward from the point O′ is coincident with the point O. This condition is satisfied when L is equal to 2 f. When the interferometers are disposed so as to have optical axes passing through the point P, the distance from the point P to the reflecting mirror Mx is not changed by the inclination of the movable holder 5 so far as errors of α of the second and higher orders are ignored. In other words, it is possible to correctly measure the location of the point O regardless of the inclination of the movable holder 5 when the interferometers are disposed as described above. In other words, it is possible to correctly measure the location of the point O with no Abbe's error in that case. For a reason which is quite the same as that described above with reference to the inclination of the movable holder 5 around the Y axis, it is possible to eliminate Abbe's error when the movable holder 5 is rotated around the X axis.

Figure 6:
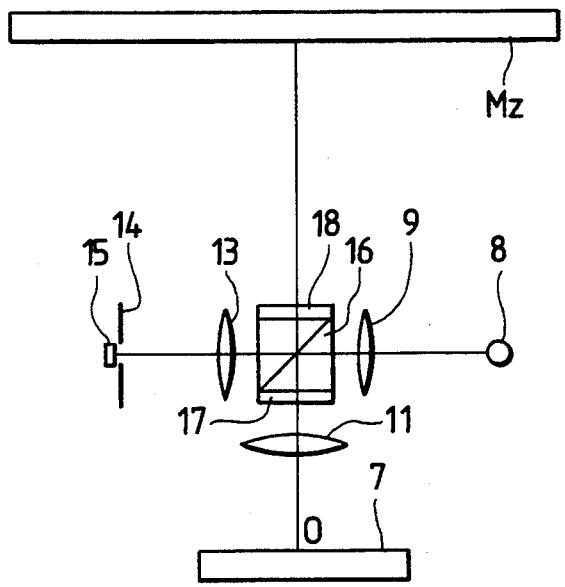
FIG. 6 is a diagram illustrating a configuration of a second embodiment of the high precision coordinate measuring device according to the present invention.

FIG. 6 illustrates the second embodiment of the high precision coordinate measuring device according to the present invention which is based on the same principle as that of the first embodiment shown in FIG. 5. Since a light beam emitted from a light source 8 is a linearly polarized light beam oscillating in a direction perpendicular to a plane of incidence of a polarizing prism 16, the light beam is reflected by the polarizing prism 16, passes through a quarter wave plate 17 and illuminates an object to be measured 7. The light beam is reflected by the object 7 and the oscillating plane of the light beam is rotated 90° while it passes through the quarter wave plate 17 once again. Therefore, the light beam passes through the polarizing prism 16 and another quarter wave plate 18 and reaches the reflecting mirror Mz. The light beam is reflected by the reflecting mirror Mz, allowed to pass through the quarter wave plate 18, reflected by the polarizing prism 16, allowed to pass through the lens 13 and forms an image of the point O on the object 7 at the location of the pinhole 14.

Abbe's errors can be eliminated for measurements in the directions along the X axis and the Y axis by the optical systems illustrated in FIG. 5 and FIG. 6 as described above. As for measurements in the direction along the Z axis, Abbe's condition can be satisfied when an interferometer and a position detector are disposed so as to have optical axes coincident with each other. Since the interferometer and the position detector have a common optical axis in this case, however, it is necessary to adopt an interferometer which uses an even number of measuring light beams symmetrical with regard to the optical axis as in the third embodiment illustrated in FIG. 7. Since no shielding object exists on the optical axis of the interferometer, a light beam to be incident on the position detector is not hindered by the interferometer.

Figure 7:
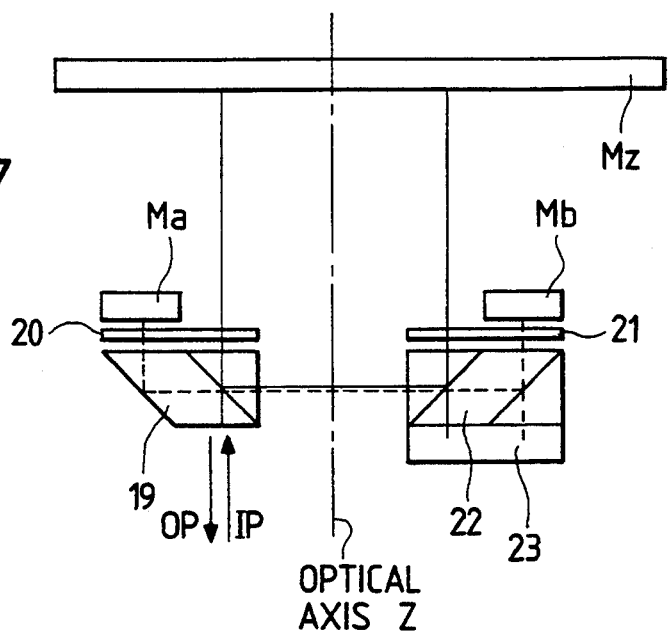
FIG. 7 is a diagram illustrating a configuration of a third embodiment of the high precision coordinate measuring device according to the present invention.

When a linearly polarized light beam IP having a plane of oscillation inclined 45° relative to the paper surface is incident on a polarizing prism 19 in FIG. 7, a linearly polarized component oscillating in parallel with the paper surface, i.e., p polarized component (indicated by a solid line), passes through the polarizing prism 19, whereas a linearly polarized component oscillating perpendicularly to the paper surface, i.e., s polarized component (indicated by a dashed line), is reflected by the polarizing prism 19. Since the optical paths for these polarized components are overlapped with each other in FIG. 7, a passage for the p polarized component will be described first with reference to FIG. 8. Reflecting mirrors Ma, Mb and quarter wave plates 20, 21 are omitted in FIG. 8. In this drawing, the reference numerals ①, ②, ③ and ④ indicate reflecting sequence by the reflecting mirror Mz.

The p polarized component which has passed through the polarizing prism 19 is allowed to pass through the quarter wave plate 20, reflected by the reflecting mirror Mz and returned to the polarizing prism 19. Since the plane of polarization of the light beam is rotated 90° while passing twice through the quarter wave plate 20, the light beam is reflected by the polarizing prism 19, enters a second polarizing prism 22 and is reflected by this prism, transmits through a quarter wave plate 21, is reflected again by the reflecting mirror Mz and returned to the polarizing prism 22. The light beam transmits through the polarizing prism 22 and is reflected by a rectangular prism 23, whereafter the light beam transmits through the polarizing prism 22, reaches again the reflecting mirror Mz and is reflected again by this mirror. This reflected light beam is reflected by the polarizing prisms 22 and 19, reaches the reflecting mirror Mz and is reflected again by this mirror. This reflected light beam transmits through the quarter wave plate 20 and the polarizing prism 19.

Figure 8:
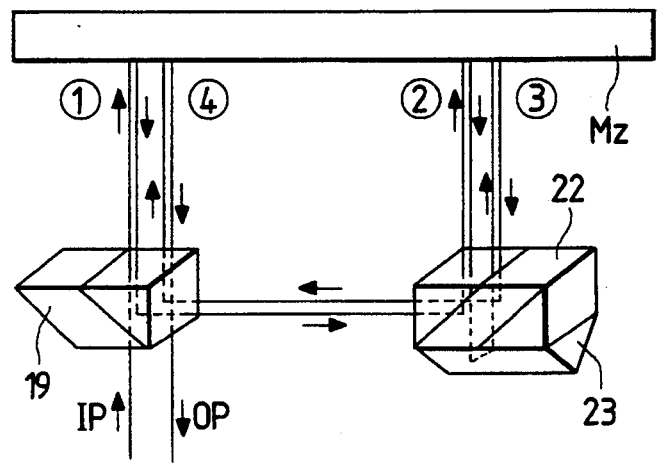
FIG. 8 is a perspective view descriptive of a portion of the third embodiment shown in FIG. 7.

On the other hand, the s polarized component, which is not shown or described in or with reference to FIG. 8, is reflected by the polarizing prism 19, reflected twice by the reflecting mirrors Mb and Ma respectively, finally reflected by the polarizing prism 19, and emerges as a light beam OP following the same optical path as that for the p polarized component which is reflected and returned from the reflecting mirror Mz. Then, the s polarized component is used for detecting interference fringes by a known interference fringe detecting means (not shown). In the third embodiment illustrated in FIG. 7, four light beams which follow optical paths symmetrical with regard to the optical axis are reflected by the reflecting mirror Mz and no obstacle exists on the Z optical axis for the light beam to be incident on the position detector.

Though the third embodiment has been described above taking an example of application to a measurement in three dimensions, the third embodiment is applicable, needless to say, to measurements in two dimensions and one dimension. Speaking concretely, the third embodiment is applicable to measurements in two X and Y dimensions when the reflecting mirror Mz is omitted, and measurements in one dimension when the Z and Y interferometers are omitted.

Figure 9:
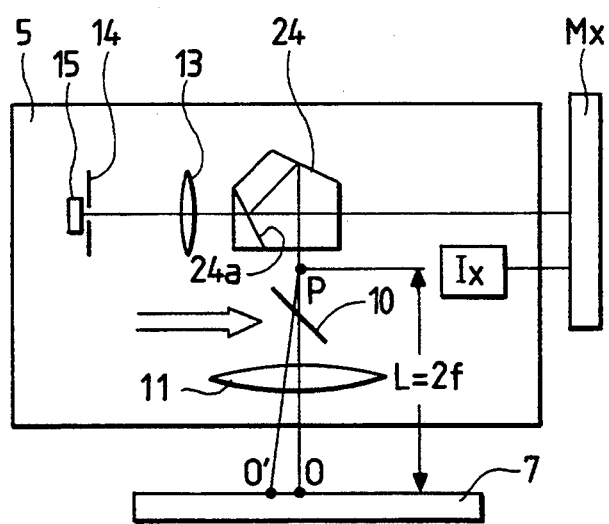
FIG. 9 is a diagram illustrating a configuration of the high precision coordinate measuring device according to the present invention to be used for length measurement.

FIG. 9 illustrates an embodiment wherein a reflecting mirror Mx is used in place of the reflecting mirror Mz. In this embodiment, a pentagonal prism 24 having a reflecting surface 24a designed as a half mirror is used in place of the half mirror shown in FIG. 5. An illumination light beam which is indicated by a thick arrow is reflected at a point O on an object to be measured and made into a parallel light beam by an objective lens 11, whereafter the light beam is reflected by a top surface and the half mirror surface 24a of the pentagonal prism 24, and reaches the reflecting mirror Mx. The light beam is reflected by the reflecting mirror Mx, allowed to pass through the half mirror surface 24a of the pentagonal prism 24 and focused by a lens 13 onto a location of a pinhole 14. On an assumption that the reflecting mirror Mx is rotated together with the movable holder 5 when this holder is rotated clockwise at an angle of $\alpha$ around a point P which is located on the optical axis at a distance of L from the point O, the photodetector detects a point O' which is deviated leftward from the point O on the optical axis for a distance $\alpha L$. Since the reflecting mirror Mx is not rotated actually, however, the photodetector detects a point which is deviated $2 f\alpha$ rightward from the point O'. Accordingly, it is possible to perform measurements free from Abbe's errors by disposing the X interferometer Ix at a distance of 2 f from the object to be measured 7.

Now, referring to FIG. 3 and FIGS. 10 through 13, description will be made, as the fourth embodiment of the present invention, of an optical system of an interferometer applicable to the high precision coordinate measuring device according to the present invention. First, description will be made of a method for eliminating Abbe's error adopted for the fourth embodiment. FIG. 10 shows only a section, of the first embodiment shown in FIG. 3, which is to be used for measurements only in the direction of the X axis. In FIG. 10, an X interferometer Ix which is fixed to a movable holder 5 is equipped with two interferometers 25 and 26 connected through cables with a subtractor 27 for performing predetermined operations on the basis of numbers of interference fringes measured with these interferometers. The interferometers 25 and 26 are fixed at locations apart for distances of D and L from a plane including a measuring point O of a position detector 6.

FIG. 11 shows a diagram descriptive of main optical paths of the interferometer 25 shown in FIG. 10. In FIG. 11, all optical members are fixed to the movable holder 5. The reference numeral 28 represents a polarizing prism. Out of the components of a light beam incident on the polarizing prism 28, the linearly polarized component which oscillates in parallel with the paper surface (p component) is allowed to transmit through the polarizing prism 28 and a quarter wave plate 29, reflected by a reflecting mirror Mx, allowed to transmit again through the quarter wave plate 29, reflected by the polarizing prism 28 and travels toward another polarizing prism 30. This component is reflected by the polarizing prism 30, allowed to transmit through a quarter wave plate 31, reflected by a fixed reflecting mirror 32, allowed to transmit again through the quarter wave plate 31 and allowed this time to transmit through the polarizing prism 30. The component is reflected by a rectangular prism 33, transmits through the polarizing prism 30 and the quarter wave plate 31, and travels toward the reflecting mirror Mx. The component is reflected by the reflecting mirror Mx, allowed to transmit through the quarter wave plate 31, reflected by the polarizing prisms 30 and 28, reflected by another fixed reflecting mirror 34, allowed to transmit again through the quarter wave plate 29 and the polarizing prism 28, and emerges from the polarizing prism 28.

On the other hand, the linearly polarized component oscillating perpendicularly to the paper surface (s component) is reflected by the polarizing prism 28 and a rear surface (top surface in FIG. 11) of a quarter wave plate 35 which is designed as a reflecting mirror allowed to transmit through the polarizing prisms 28 and 30, and reflected by a rear surface (bottom surface in FIG. 11) of a quarter wave plate 36 which is designed as a reflecting mirror like that of the quarter wave plate 35. Then, the component is reflected by the polarizing prism 30, folded back by a rectangular prism 33, reflected by the polarizing prism 30, reflected again by the quarter wave plate 36, allowed to transmit through the polarizing prisms 30 and 28, reflected by the quarter wave plate 35 and the polarizing prism 28, and emerges from the polarizing prism 28. The s component emerges from the polarizing prism 28 together with the p component.

Figure 13:
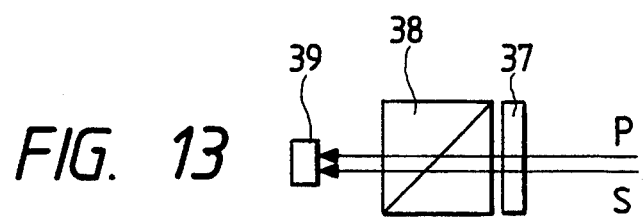
FIG. 13 is a diagram illustrating a composition of a photodetector omitted in FIG. 10.

FIG. 12 shows a layout of main optical paths in the interferometer 26 in which the fixed reflecting mirrors 32 and 34 are omitted unlike the layout of the optical paths illustrated in FIG. 11. Two light beams travel toward the reflecting mirror Mx in case of the interferometer 25, whereas four light beams travel toward the reflecting mirror Mx in case of the interferometer 26. In the interferometers 25 and 26, the light beams emerging from the polarizing prism 28 are led into an interference fringe detecting system shown in FIG. 13. In FIG. 13, the reference numeral 37 represents a half wave plate, and the p and s components described above are allowed, after the planes of polarization thereof are rotated 45° around the optical axis by the half wave plate 37, to transmit through a polarizing prism 38 so as to produce interference fringes which are to be detected with a known photodetector 39. Intensities of the interference fringes are converted into electrical signals by the photodetector 39 and numbers of the interference fringes are counted by known means.

Let us assume that the measuring point O of the position detector is displaced for a distance of S in the direction along the X axis by displacement of the movable holder 5 and that the movable holder is inclined clockwise at an angle of $\alpha$ after the displacement of the movable holder. Numbers of Z1 and Z2 the interference fringes measured by the interferometers 25 and 26 respectively are given by the following formulae:

$$Z1 = (S - D\alpha)/(\lambda/4) \tag{1}$$

$$Z2 = (S - L\alpha)/(\lambda/8) \tag{2}$$

Hence, the subtractor 27 calculates a difference of Z as follows:

$$Z = Z2 - Z1 = \{S - (2L - D)\alpha\}/(\lambda/4) \tag{3}$$

When D=2L, the formula (3) gives the difference Z as follows:

$$Z = S/(\lambda/4) \tag{4}$$

Therefore, influence due to the inclination $\alpha$ is eliminated and displacement S is determined by the following formula (5)

$$S = (\lambda/4)Z \tag{5}$$

Since Z has a value which is not changed by the rotation of the position detector 6 around the measuring point O as is understood from the foregoing description, it is possible to eliminate Abbe's errors. In FIG. 10, the reference numeral 40 represents a probe for detecting a location of the measuring point O of the position detector 6. In a case where the position detector is a photoelectric microscope, rays focused onto a point to be measured is used as the probe. Utilizable as the position detector are different known instruments such as a scanning tunneling microscope and an atomic force microscope.

Figure 14:
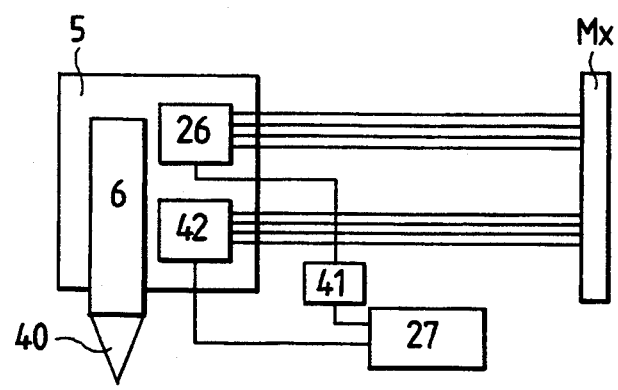
FIG. 14 is a diagram illustrating a configuration of a fifth embodiment of the high precision coordinate measuring device according to the present invention.

FIG. 14 illustrates the fifth embodiment of the high precision coordinate measuring device according to the present invention. The fifth embodiment adopts an interferometer optical system illustrated in FIG. 12 in place of the interferometer optical system shown in FIG. 10. In the interferometer optical system shown in FIG. 12, a circuit 41 provides a single count pulse to a subtractor 27 when two interference fringes are counted.

Another interferometer 42 provides a single count pulse to the subtractor 27 when a single interference fringe is counted. Since a single interference fringe count pulse from each of the interferometers corresponds to $\lambda/8$, output from the subtractor 27 is expressed by the above-mentioned formula (3). Accordingly, Abbe's errors are eliminated when D=2L as in the case of the fourth embodiment.

Though the interferometer 42 provides a count pulse for a single interference fringe in the fifth embodiment for convenience of description, it is easy, by utilizing the known interference fringe dividing method, to measure fractions of interference fringes by corresponding a plurality of, for example two or four, count pulses to a single interference fringe.

When the interferometer 26 uses an interference fringe detecting system which detects M count pulses per interference fringe and the interferometer 42 adopts an interference fringe detecting system which detects N count pulses (N is larger than M) per interference fringe, it is possible, when the condition of MD=NL, to eliminate Abbe's error and perform finer measurements by dividing interference fringes.

Figure 15:
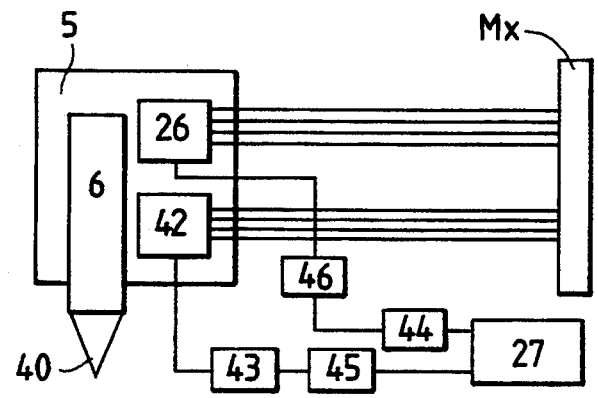
FIG. 15 is a diagram illustrating a configuration of a sixth embodiment of the high precision coordinate measuring device according to the present invention.

FIG. 15 illustrates the sixth embodiment of the high precision coordinate measuring device according to the present invention. In this embodiment, a number of count pulses provided from an interferometer 26 is counted by a counter 46 and multiplied by M by a multiplier 24, and a number of count pulses provided from an interferometer 42 is counted by a counter 43 and multiplied by N by a multiplier 45, whereafter the count pulses are input into a subtractor 27. In this embodiment also, Abbe's errors are eliminated when MD is equal to NL. When a single count pulse provided from the interferometer 26 or 42 corresponds to a length of $\lambda/2K$ (K: an integer), displacement S of the measuring point of the position detector 6 is given by the following formula (6):

$$S = \lambda Z/2K (N - M) \tag{6}$$

wherein the reference symbol Z represents output from the subtractor 27.

Figure 16:
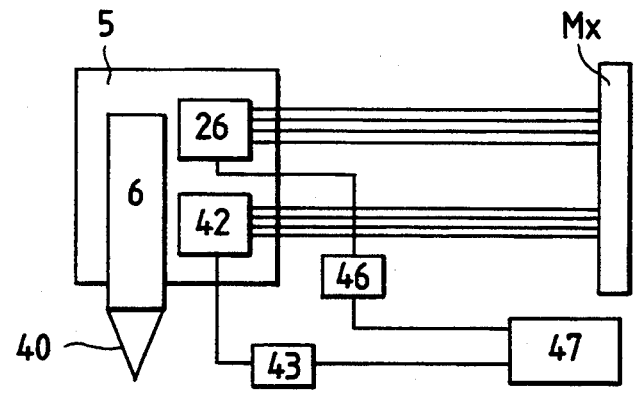
FIG. 16 is a diagram illustrating a configuration of a seventh embodiment of the high precision coordinate measuring device according to the present invention.
Figure 13:
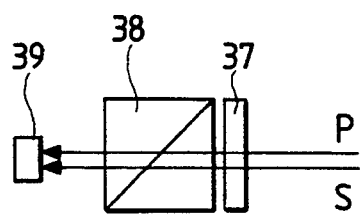
Figure 14:
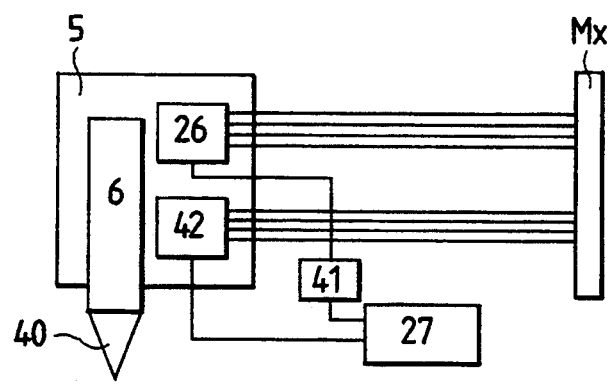
Figure 15:
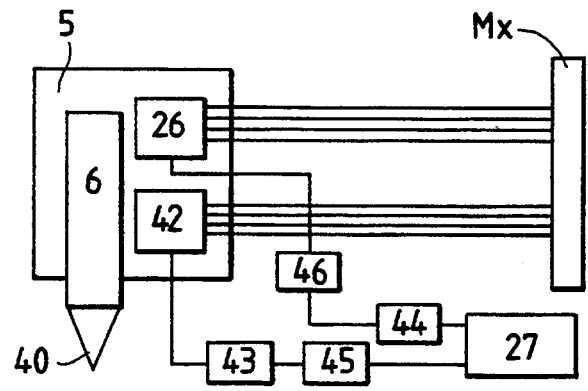
Figure 16:
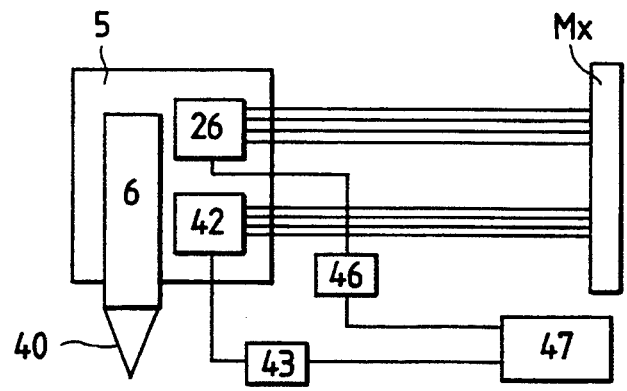

FIG. 16 illustrates the seventh embodiment of the high precision coordinate measuring device of the present invention wherein an operator 47 determines displacement S using count values Z1 and Z2 which are obtained with counter 46 and 43. When a count value measured by the counter 46 is represented by Z1, displacement d1 of the interferometer 26 is:

$$d1 = S - D\alpha = Z1(\lambda/2K) \tag{7}$$

When a count value measured with the interferometer 42 is represented by Z2, displacement of the interferometer 42 is:

$$d2 = S - L\alpha = Z2(\lambda/2K) \tag{8}$$

In a condition expressed by the following formula (9):

$$m = L/D \tag{9}$$

the operator 47 performs an operation expressed by the following formula (10) or (11):

$$S = (\lambda/2k)(Z2 - mZ1)/(1 - m) \tag{10}$$

$$S = (d2 - md1)/(1 - m) \tag{11}$$

Correct displacement S which is not affected by Abbe's error is obtained by the operations described above. When $m = \frac{2}{3}$ is selected, we obtain D−L=L/2 and a spacing (D−L) between the two interferometers can be set at L/2. Even when the numbers of the reciprocal travelling of light beams between the two interferometers and the reflecting mirrors are different, it is very easy to obtain a formula which corresponds to the formula (10) or (11). It is needless to say that the present invention has a scope which covers such a case.

Figure 17:
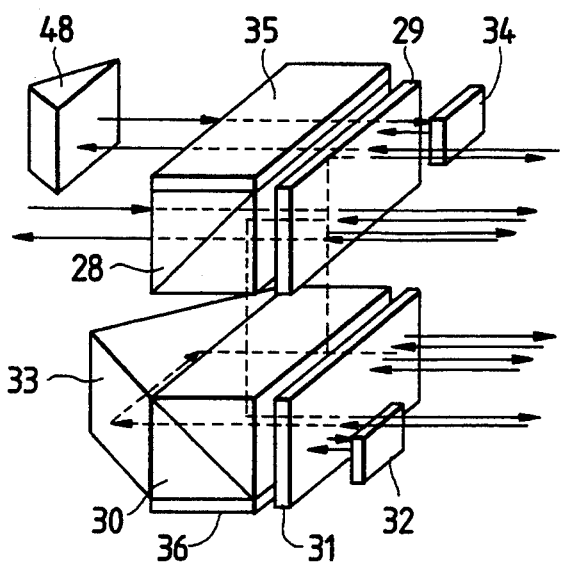
FIG. 17 is a diagram descriptive of optical paths of interferometers used in an eighth embodiment of the high precision coordinate measuring device according to the present invention.
Figure 18:
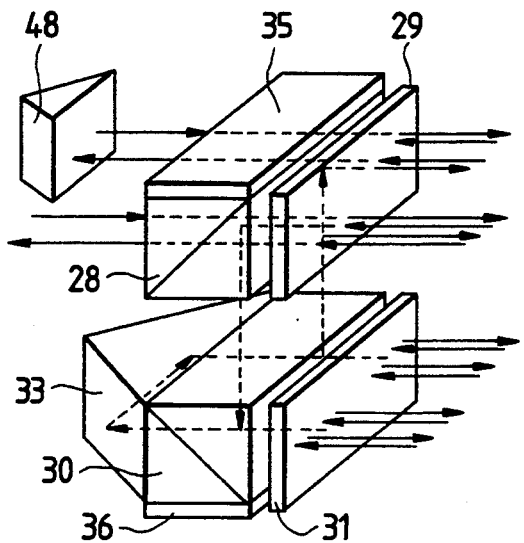
FIG. 18 is a diagram descriptive of different optical paths of the interferometers used in the eighth embodiment of the present invention.

FIG. 17 and FIG. 18 illustrate the eighth embodiment of the high precision coordinate measuring device according to the present invention. The eighth embodiment is an example wherein the light beams emerging from the optical systems shown in FIG. 11 and FIG. 12 are returned to the interferometers by a rectangular prism 48, and the optical system shown in FIGS. 17 and 18 are is used as the interferometer 25 and 26 adopted in the embodiment illustrated in FIG. 10 respectively. In the eighth embodiment, a measuring light beam reciprocally travels six times between the interferometer 25 and the reflecting mirror Mx. Another measuring light beam for the interferometer 26 reciprocally travels eight times between the interferometer 26 and the reflecting mirror Mx. Accordingly, Abbe's error is eliminated when a condition of 3D=4L is satisfied. A spacing between optical axes of the interferometer 25 and the interferometer 26 is D−L which is equal to L/3. Consequently, it is possible to shorten the spacing between the interferometers or make the interferometers more compact so far as L is kept unchanged. It is possible to set the measuring point at a farther location so far as the spacing between the interferometers is kept unchanged.

As is understood from the description of the fourth through the eighth embodiments of the present invention, it is possible to determine correct displacement S free from Abbe's error according to the formula (10) or (11) when two interferometers are used and $m=N/M=L/D$ is selected. Though the interferometers are fixed to the movable holder 5 and the reflecting mirrors are fixed to the base 4 in the embodiments described above, it is possible to eliminate Abbe's error, so far as the formulae mentioned above establish, even when the reflecting mirrors are fixed to the movable holder and the interferometers are fixed to the base.

Figure 19:
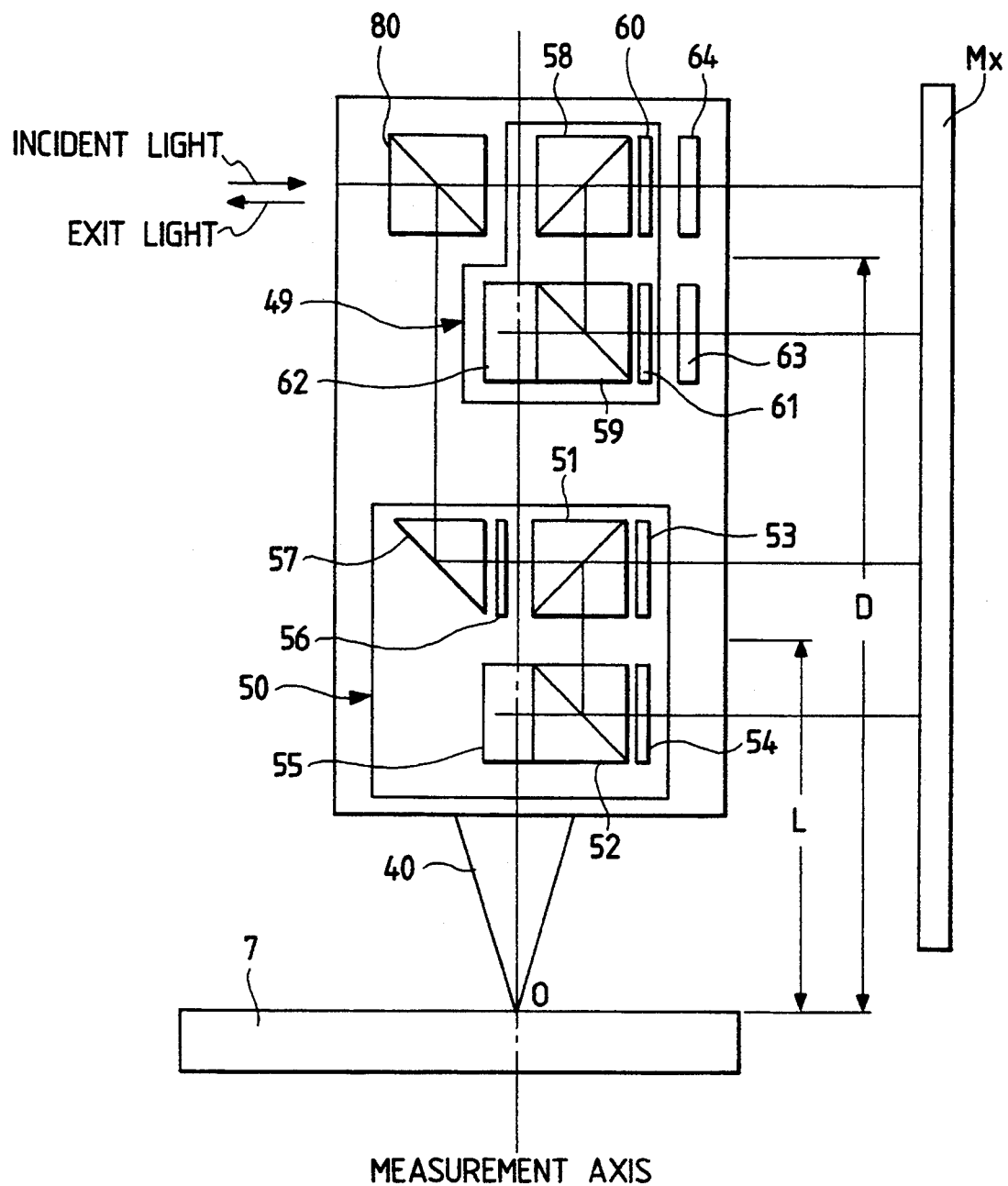
FIG. 19 is a diagram illustrating a configuration of a ninth embodiment of the high precision coordinate measuring device according to the present invention.

The ninth embodiment of the high precision coordinate measuring device according to the present invention will be described below with reference to FIG. 3, FIG. 19 and FIG. 20. FIG. 19 shows an optical path layout in an X interferometer Ix adopted for the ninth embodiment. In the ninth embodiment also, the X interferometer is fixed to a movable holder 5. In FIG. 19, a reference numeral 80 represents a polarizing prism which allows a linearly polarized component oscillating in the direction in parallel with the paper surface, i.e., p component, to pass therethrough and to be incident on a reference optical system 49. A linearly polarized component oscillating in the direction perpendicular to the paper surface, i.e., s component, is reflected by the polarizing prism 80 and incident on a measuring optical system 50. The measuring optical system 50 is composed of polarizing prisms 51, 52, quarter wave plates 53, 54, a half wave plate 56, a rectangular prism 55 and a reflecting prism 57. The reference optical system 49 is composed of polarizing prisms 58, 59, quarter wave plates 60, 61, and a rectangular prism 62. Further, fixed to the movable holder 5 are reflecting mirrors 63 and 64.

The p component which has passed through the polarizing prism 80 is allowed to transmit through the polarizing prism 58 and the quarter wave plate 60, reflected by a reflecting mirror Mx fixed to a base 4, allowed to transmit again through the quarter wave plate 60, reflected by the polarizing prism 58 and travels toward the polarizing prism 59. Then the component is reflected by the polarizing prism 59, allowed to transmit through the quarter wave plate 61, reflected by the reflecting mirror 63 fixed to the movable holder 5, allowed to transmit again through the quarter wave plate 61, and allowed to pass through the polarizing prism 59. After being reflected by the rectangular prism 62, the component transmits through the polarizing prism 59 and the quarter wave plate 61, thereafter travelling toward the reflecting mirror Mx. Then the component is reflected by the reflecting mirror Mx, allowed to pass through the quarter wave plate 61, reflected by the polarizing prism 59 and travels toward the polarizing prism 58. Then the component is reflected by the polarizing prism 58, reflected by the reflecting mirror 64 fixed to the movable holder 5, and transmits again through the quarter wave plate 60 and the polarizing prism 58, thereafter emerging from the reference optical system 49. Accordingly, the reference optical system 49 has a characteristic that it does not change a travelling direction of the light beam emerging from the polarizing prism 80 fixed to the movable holder 5 even when the reflecting mirror Mx is inclined.

On the other hand, the s component is reflected by the polarizing prism 80 and the reflecting prism 57, and transmits through the half wave plate 56. Then, the s component is incident on the measuring optical system 50 consisting of the polarizing prisms 51, 52 and the rectangular prism 55. The passage of the s component is similar to that of the p component, except for a fact that the s component is reflected by the reflecting mirror Mx in place of the reflecting mirrors 63 and 64.

Now, let us consider a case where the movable holder 5 is slightly rotated, for example clockwise, around the measuring point O. Assuming that the movable holder 5 is rotated at an angle of $\alpha$ and errors of the second and higher orders are ignorable, an optical path length is shortened $4D\alpha$ in the reference optical system. The reference symbol D represents a distance from the measuring point to the optical axis of the reference optical system in the direction along the Z axis. The optical axis of the reference optical system is an axis of symmetry for the four light beams travelling toward the reflecting mirror. In the measuring optical system which comprises no reflecting mirror, optical path length is shortened $8L\alpha$ by the inclination of the movable holder 5. The reference symbol L represents a distance between the measuring point and the optical axis of the measuring optical system. Accordingly, a difference in optical path length between the reference optical system and the measuring optical system is not changed by the inclination of the movable holder 5 when D is equal to 2L. Since the difference in optical path length is not changed by the inclination of the movable holder 5 so far as it is rotated around the measuring point O, the location of the measuring point O can be measured correctly irrespective of the inclination of the movable holder 5. That is to say, Abbe's error can be eliminated. So far as the measuring axis is located on a plane included in the paper surface, the position detector may be shifted, for example leftward, so that it will not strike against the optical systems of the interferometer.

Figure 20:
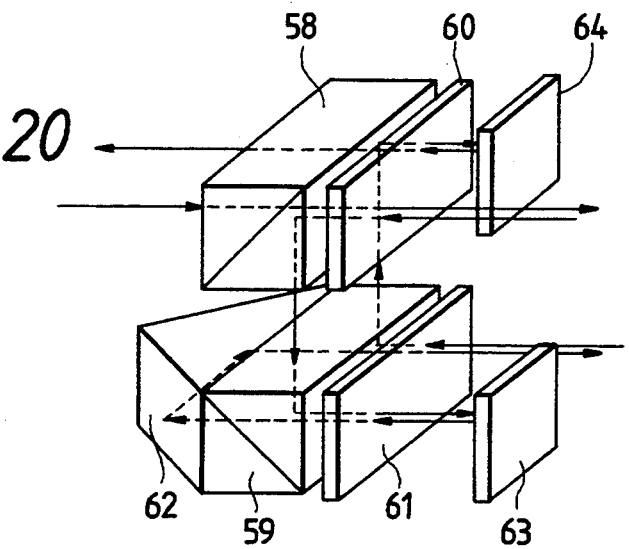
FIG. 20 is a diagram descriptive of optical paths of interferometers used in the ninth embodiment of the present invention.
Figure 21:
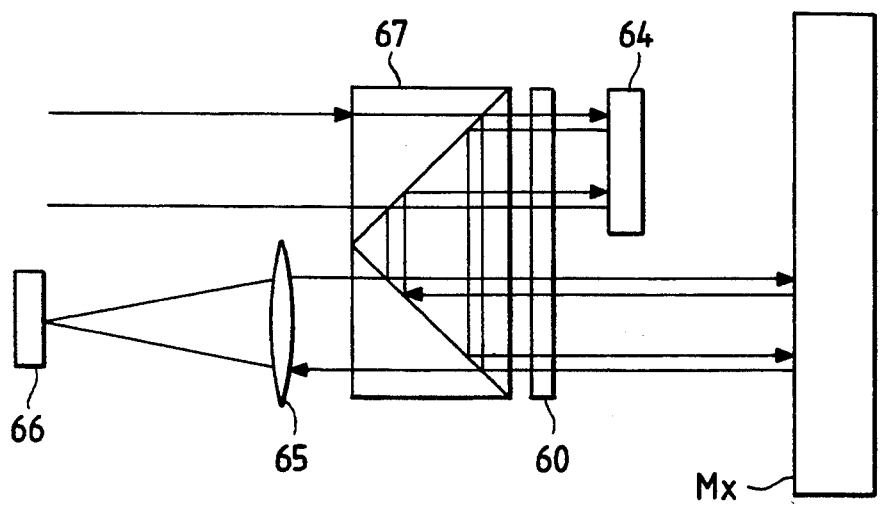
FIG. 21 is a diagram illustrating a configuration of a tenth embodiment of the high precision coordinate measuring device according to the present invention.

FIG. 21 illustrates the tenth embodiment of the high precision coordinate measuring device according to the present invention wherein a reference optical system uses the so-called cat's eye (65 and 66) which consists of a lens 65 and a reflecting mirror 66 disposed at a focal point of the lens 65 in place of the rectangular prism 62 shown in FIG. 20. In the tenth embodiment, an integrated type prism 67 is used in place of the two polarizing prisms 58 and 59 shown in FIG. 20. In this reference optical system, a light beam reciprocally travels twice between an interferometer and a fixed reflecting mirror 62, and twice between the interferometer and a reflecting mirror Mx. The fixed reflecting mirror 64 is omitted in a measuring optical system. Accordingly, a light beam reciprocally travels four times between an interferometer and the reflecting mirror Mx in the measuring optical system.

Figure 22:
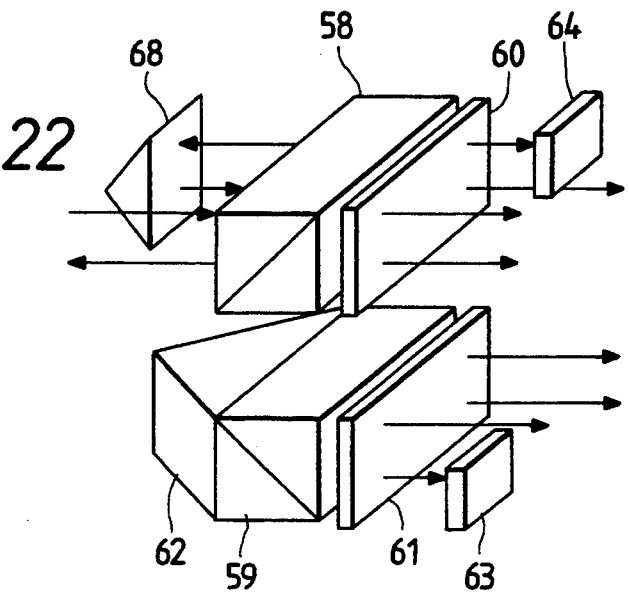
FIG. 22 is a diagram illustrating disposition of main members in an eleventh embodiment of the high precision coordinate measuring device according to the present invention.

FIG. 22 illustrates the eleventh embodiment of the high precision coordinate measuring device according to the present invention, wherein the light beam emerging from the optical system shown in FIG. 20 is returned to an interferometer optical system by a rectangular prism 68. In the eleventh embodiment, a reference light beam reciprocally travels six times between an interferometer and a reflecting mirror Mx. In a measuring optical system which does not comprise the reflecting mirrors 63 and 64 shown in FIG. 22, a light beam reciprocally travels eight times between an interferometer and the reflecting mirror Mx. Accordingly, a difference in optical path length between the reference optical system and the measuring optical system is not changed by inclination of the movable holder 5 so far as 3D is equal to 4L. The eleventh embodiment selects a spacing of D−L which is equal to L/3 between the reference optical system and the measuring optical system. It is therefore possible to make the interferometers more compact by shortening the spacing between the optical systems so far as L is kept unchanged. When the spacing is kept unchanged, it is possible to locate a measuring point at a farther point.

Figure 23:
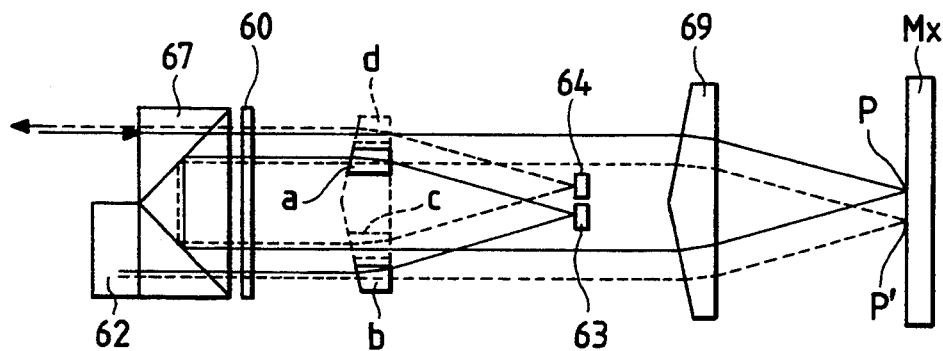
FIG. 23 is a diagram illustrating a configuration of a twelfth embodiment of the high precision coordinate measuring device according to the present invention.
Figure 24:
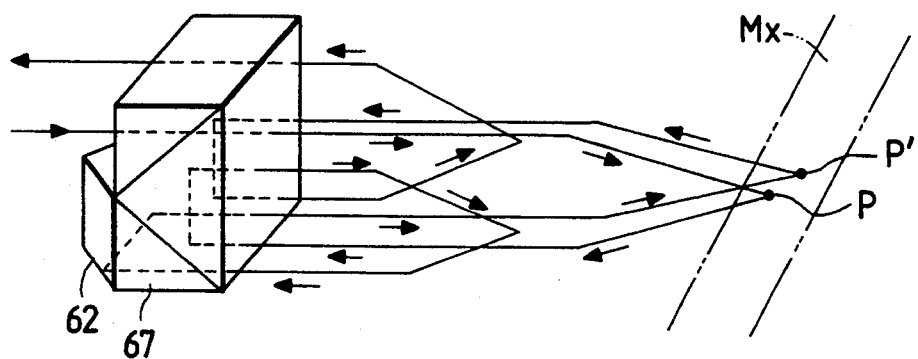
FIG. 24 is a diagram descriptive of main optical paths in the twelfth embodiment of the present invention.

FIG. 23 illustrates the twelfth embodiment of the high precision coordinate measuring device according to the present invention which is applicable to measurements of one-dimensional (length) and two-dimensional coordinates as well as three dimensions including a direction along the Z axis though only within a limited range. A polarizing prism 67 has the same structure as that of the polarizing prism shown in FIG. 21. A biprism 69 is disposed before the reflecting mirror Mx. The biprism is fixed to a base 4 together with a reflecting mirror Mx. FIG. 24 is a diagram descriptive of optical paths wherein optical elements other than a rectangular prism 62 and a polarizing prism 67 are omitted. A light beam incident in the direction along the arrow is allowed to transmit through the polarizing prism 67 and the quarter wave plate 60, refracted by the biprism 69, reflected by the reflecting mirror Mx, allowed to pass again through the biprism 69 and enters the polarizing prism 67 as a parallel light beam. The light beam is reflected by the polarizing prism 67, allowed to transmit through a quarter wave plate 60 and a prism a, reflected by the reflecting mirror 63, allowed to pass through a prism b, the quarter wave plate 60 and the polarizing prism 67, and reflected by the rectangular prism 62. Then, the light beam travels in a sequence indicated by the arrows, and emerges from the polarizing prism 67. The prisms a and b as well as prisms c and d are formed by cutting off portions of the biprism 69, and fixed to the movable holder 5 like the polarizing prism 67. The members described above are used for composing a reference interferometer. A measuring interferometer is composed of all these members except the prisms a, b, c, d and the reflecting mirrors 63, 64. When these interferometers are used, Abbe's error is eliminated when a condition of D=2L is satisfied. It is possible to obtain a coordinate measuring device free from Abbe's error by using the interferometers described above as the interferometers Ix and Iy shown in FIG. 3. Further, it has already been described that Abbe's error can be eliminated even by using the known interferometers when the optical axes of the position detector, and the Z interferometer Iz are coincident with each other in FIG. 3.

Figure 25:
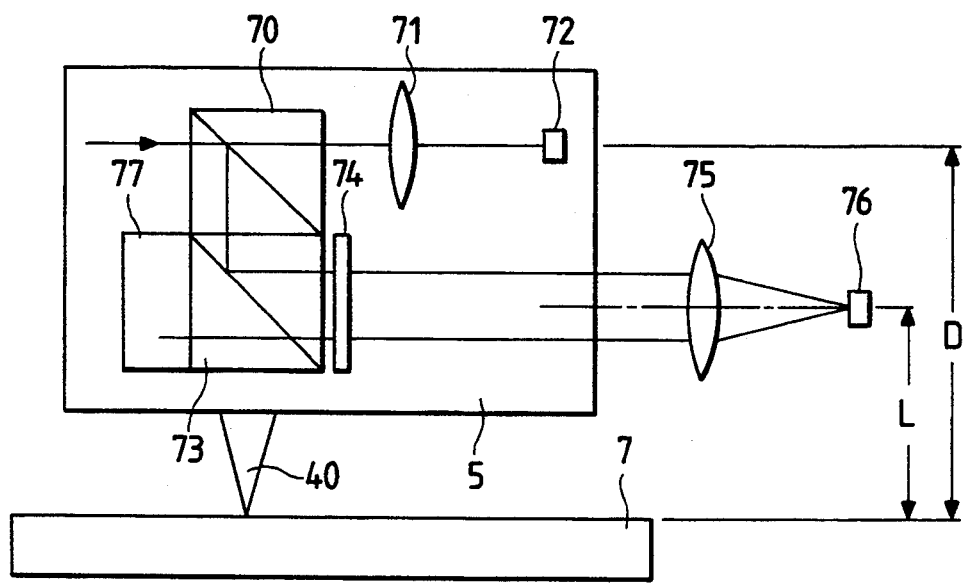
FIG. 25 is a diagram illustrating a configuration of a thirteenth embodiment of the high precision coordinate measuring device according to the present invention.
Figure 26:
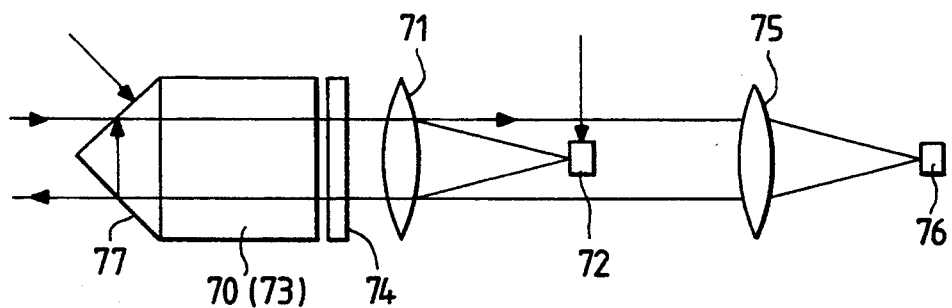
FIG. 26 is a diagram descriptive of main optical paths in the thirteenth embodiment of the present invention.

FIG. 25 and FIG. 26 illustrate the thirteenth embodiment of the high precision coordinate measuring device according to the present invention. The thirteenth embodiment is configured so as to be suited for measuring one dimension, and allow a measuring light beam and a reference light beam to reciprocally travels twice and once respectively. Speaking concretely, the p component which has passed through a polarizing prism 70 is reflected by the so-calked cat's eye (71 and 72) which consists of a lens 71 and a reflecting mirror 72 disposed at a focal point of the lens, and then allowed to transmit again through the polarizing prism 70. On the other hand, the s component which has been reflected by the polarizing prism 70 is reflected by another polarizing prism 73, allowed to transmit through a quarter wave plate 72, and reflected by another cat's eye (75 and 76) which consists of a lens 75 and a reflecting mirror 76 fixed to a base 4. The s component is returned to the polarizing prism 73, allowed to transmit through this polarizing prism, reflected by a rectangular prism 77, allowed to transmit through the polarizing prism 73 and the quarter wave plate 74, reflected by the cat's eye (75 and 76), reflected by the polarizing prisms 73 and 71, and emerges together with the p component. Interference fringes can be detected by passing these two emerging components through an analyzer which is oriented at an angle of 45° relative to the p component. The known methods for detecting the interference fringes are applicable to all the embodiments of the present invention described above.

As is understood from the foregoing description of the embodiments of the present invention, Abbe's error can be eliminated, when the condition NL=MD is satisfied, by allowing a measuring light beam to reciprocally travel N times (N: an integer of 2 or larger) between an interferometer and a reflecting mirror and allowing a reference light beam to reciprocally travel M times (M: an integer smaller than N) between an interferometer and the reflecting mirror.

Though the X interferometer Ix is fixed to the movable holder 5 and the X axis reflecting mirror Mx is fixed to the base 4 in the embodiments of the present invention, it is possible to eliminate Abbe's error, so far as the condition NL=MD is satisfied, even when the reflecting mirror is fixed to the movable holder 5 and the interferometer is fixed to the base 4.

What is claimed is:

1. A high precision coordinate measuring device comprising:

a base, a reflecting mirror fixed to said base on a plane perpendicular to a given axis, a movable holder disposed so as to be movable relative to said base along said axis, an optical position detector, which is fixed to said movable holder and includes a light source, an objective lens having a focal length of f, and a photodetector detecting light emitted from said light source, transmitted through said objective lens focusing on a point to be measured on an object, reflected at said object, transmitted through said objective lens again and reflected at said reflecting mirror, and an interferometer optical system fixed to said movable holder disposed at a distance 2 f from said point to be measured on said object, for measuring a location of said point to be measured relative to said reflecting mirror.

2. A high precision coordinate measuring device comprising:
   a base,
   a X reflecting mirror fixed to said base on a plane perpendicular to a X axis,
   a Y reflecting mirror fixed to said base on a plane perpendicular to a Y axis,
   a movable holder disposed so as to be movable relative to said base along said X axis and said Y axis,
   an optical position detector, which is fixed to said movable holder and includes a light source, an objective lens having a focal length of f, and a photodetector detecting light emitted from said light source, transmitted through said objective lens focusing on a point to be measured on an object, reflected at said object, transmitted through said objective lens again and reflected at one of said X and Y reflecting mirror,
   a X interferometer optical system fixed to said movable holder at a distance 2 f from said point to be measured said object, for measuring a location of said point to be measured relative to said X reflecting mirror, and
   a Y interferometer optical system fixed to said movable holder at a distance 2 f from said point to be measured on said object, for measuring a location of said point to be measured relative to said Y reflecting mirror.

3. A high precision coordinate measuring device comprising:
   a base,
   a X reflecting mirror fixed to said base on a plane perpendicular to a X axis,
   a Y reflecting mirror fixed to said base on a plane perpendicular to a Y axis,
   a Z reflecting mirror fixed to said base on a plane perpendicular to a Z axis,
   a movable holder disposed so as to be movable relative to said base along said X axis, said Y axis and said Z axis,
   an optical position detector, which is fixed to said movable holder, and includes a light source, an objective lens having a focal length of f, and a photodetector detecting light emitted from said light source, transmitted through said objective lens focusing on a point to be measured on an object, reflected at said object, transmitted through said objective lens again and reflected at said X, Y or Z reflecting mirror,
   a X interferometer optical system fixed to said movable holder at a distance 2 f from said point to be measured on said object, for measuring a location of said point to be measured relative to said X reflecting mirror,
   a Y interferometer optical system fixed to said movable holder at a distance 2 f from said point to be measured on said object, for measuring a location of said point to be measured relative to said Y reflecting mirror, and
   a Z interferometer optical system fixed to said movable holder, for measuring a location of said point to be measured relative to said Z reflecting mirror.

4. A high precision coordinate measuring device according to claim 3, wherein light to be detected by said photodetector is reflected by the Z reflecting mirror and said Z interferometer optical system is disposed so that light beams coming from said Z interferometer optical system are symmetrical with regard to an optical axis of said position detector at a location of said Z reflecting mirror.

5. A high precision coordinate measuring device comprising:
   a base,
   a reflecting mirror fixed to said base,
   a movable holder disposed so as to be movable relative to said base in a direction perpendicular to said reflecting mirror,
   a position detector fixed to said movable holder for detecting a point to be measured, and
   an interferometer optical system including a first interferometer and a second interferometer, fixed to said movable holder, for measuring relative displacement between said reflecting mirror and the point to be measured detected by said position detector;
   wherein each of said first interferometer and said second interferometer has a measuring optical system and a reference optical system, the measuring optical system of said first interferometer has an optical axis located at a distance L from the point to be measured detected by said position detector, the measuring optical system of said second interferometer has an optical axis located at a distance of D, D not being equal to L, from said point to be measured, and said measuring device is configured so as to calculate displacement S of the point to be measured by the following formula:

$$S = (d2 - md1)/(1 - m)$$

where the reference symbol d1 represents a value of displacement of said movable holder measured with said first interferometer, the reference symbol d2 designates a value of displacement of said movable holder measured with said second interferometer, and the reference symbol m denotes a value of L/D.

6. A high precision coordinate measuring device comprising:
   a base,
   a movable holder disposed so as to be movable relative to said base in one direction,
   a reflecting mirror fixed to said movable holder,
   a position detector fixed to said movable holder for detecting a point to be measured, and
   an interferometer optical system including a first interferometer and a second interferometer, fixed to said base, for measuring relative displacement between said base and the point to be measured detected by said position detector;
   wherein each of said first interferometer and said second interferometer has a measuring optical system and a reference optical system, the measuring optical system of said first interferometer has an optical axis located at a distance L from the point to be measured detected by said position detector, the measuring optical system of said second interferometer has an optical axis located at a distance D, D not being equal to L, from said point to be measured, and said measuring device is configured so as to calculate displacement S of the point to be measured by the following formula:

$$S = (d2 - md1)/(1 - m)$$

where the reference symbol d1 represents a value of displacement of said movable holder measured with said first interferometer, the reference symbol d2 designates a value of displacement of said movable holder measured with said second interferometer and the reference symbol m denotes a value of L/D.

7. A high precision coordinate measuring device comprising:

a base, a reflecting mirror fixed to said base, a movable holder disposed so as to be movable relative to said base in a direction perpendicular to said reflecting mirror, a position detector fixed to said movable holder for detecting a point to be measured, and an interferometer optical system including a first interferometer and a second interferometer, both fixed to said movable holder, for measuring relative displacement between said reflecting mirror and the point to be measured detected by said position detector;

wherein each of said first interferometer and said second interferometer has a measuring optical system and a reference optical system, the measuring optical system of said first interferometer has an optical axis located at a distance of L from the point to be measured detected by said position detector, the measuring optical system of said second interferometer has an optical axis located at a distance of D, D not being equal to L, from said point to be measured, and said measuring device is configured so as to satisfy the condition mentioned below and to calculate displacement of the point to be measured from a difference between a number of interference fringes including fractions measured with said first interferometer and another number of interference fringes measured with said second interferometer:

$$NL = MD$$

where the reference symbol N represents an integer of 2 or larger indicating a number of reciprocal travelling of a measuring light beam for said first interferometer which travels between said reflecting mirror and the first interferometer, and the reference symbol M designates an integer which is smaller than N and indicates a number of reciprocal travelling of a measuring light beam for said second interferometer travelling between said reflecting mirror and the second interferometer.

8. A high precision coordinate measuring device comprising:

a base, a movable holder disposed so as to be movable relative to said base, a position detector fixed to said movable holder for detecting a point to be measured, a reflecting mirror fixed to said movable holder, and an interferometer optical system including a first interferometer and a second interferometer, fixed to said base, for measuring relative displacement between said base and the point to be measured detected by said position detector;

wherein each of said first interferometer and said second interferometer has a measuring optical system and a reference optical system, the measuring optical system of said first interferometer has an optical axis located at a distance L from the point to be measured detected by said position detector, the measuring optical system of said second interferometer has an optical axis located at a distance of D, D not being equal to L from said point to be measured, and said measuring device is configured so as to satisfy the condition mentioned below and to calculate displacement of the point to be measured from a difference between a number of interference fringes including fractions measured with said first interferometer and another number of interference fringes measured with said second interferometer:

$$NL = MD$$

where the reference symbol N represents an integer of 2 or larger indicating a number of reciprocal travelling of a measuring light beam for said first interferometer which travels between said reflecting mirror and the first interferometer, and the reference symbol M designates an integer which is smaller than N and indicates a number of reciprocal travelling of a measuring light beam for said second interferometer travelling between said reflecting mirror and the second interferometer.

9. A high precision coordinate measuring device comprising:

a base, a reflecting mirror fixed to said base, a movable holder disposed so as to be movable relative to said base in a direction perpendicular to said reflecting mirror, a position detector fixed to said movable holder for detecting a point to be measured, and an interferometer fixed to said movable holder for measuring displacement of said movable holder relative to said reflecting mirror;

wherein said interferometer has a measuring optical system and a reference optical system, said measuring optical system has a measuring optical path allowing a light beam to reciprocally travel N times, wherein N is an integer having a value of 2 or larger between the interferometer and said reflecting mirror, said reference optical system has a reference optical path allowing a light beam to reciprocally travel M times, where M is an integer smaller than N between the interferometer and said reflecting mirror, and said measuring optical system and said reference optical system are positioned so as to satisfy the following condition:

$$NL = MD$$

where the reference symbol L represents a distance from the point to be measured to an optical axis of said measuring optical system and the reference symbol D designates a distance from the point to be measured to an optical axis of said reference optical system.

10. A high precision coordinate measuring device comprising:

a base, a movable holder disposed so as to be displaceable relative to said base, a position detector fixed to said movable holder for detecting a point to be measured, a reflecting mirror fixed to said movable holder, and an interferometer fixed to said base for measuring displacement of the base relative to said reflecting mirror;

wherein said interferometer has a measuring optical system and a reference optical system, said measuring optical system has a measuring optical path allowing a light beam to reciprocally travel N times, where N is an integer having a value of 2 or larger, between the interferometer and said reflecting mirror, said reference optical system has a reference optical path allowing a light beam to reciprocally travel M times, where M is an integer smaller than N, between said interferometer and said reflecting mirror, and said measuring optical system and said reference optical system are positioned so as to satisfy the following condition:

$$NL = MD$$

where the reference symbol L represents a distance from the point to be measured to an optical axis of said measuring optical system and the reference symbol D designates a distance from the point to be measured to an optical axis of said reference optical system.

11. A high precision coordinate measuring device comprising:
a base,
a X reflecting mirror and a Y reflecting mirror fixed to said base on planes perpendicular to a X axis and a Y axis respectively,
a movable holder disposed so as to be movable relative to said base in directions along the X axis and the Y axis,
a position detector fixed to said movable holder for detecting a point to be measured, and
a X interferometer and a Y interferometer, both being fixed to said movable holder, for measuring the relative locations thereof with respect to said X reflecting mirror and said Y reflecting mirror respectively;
wherein each of said X and Y interferometers has a measuring optical system and a reference optical system, said measuring optical system of said X interferometer has a measuring optical path allowing a light beam to reciprocally travel N(x) times, where N(x) is an integer having a value of 2 or larger, between the X interferometer and said X reflecting mirror, said reference optical system of said X interferometer has an optical path allowing a light beam to reciprocally travel M(x) times where M(x) is an integer smaller than N(x), between the X interferometer and said X reflecting mirror, said measuring optical system of said Y interferometer has a measuring optical path allowing a light beam to reciprocally travel N(y) times, where N(x) is an integer having a value of 2 or larger, between the Y interferometer and said Y reflecting mirror, said reference optical system of said Y interferometer has an optical path allowing a light beam to reciprocally travel M(y) times where M(x) is an integer smaller than N(y) between the Y interferometer and said Y reflecting mirror, and said measuring optical system and said reference optical system of said X interferometer and said measuring optical system and said reference optical system of said Y interferometer are positioned so as to satisfy the following conditions:

$$N(x)L(x) = M(x)D(x)$$

$$N(y)L(y) = M(y)D(y)$$

where the reference symbols L(x), D(x), L(y), and D(y) represent distances from the point to be measured to optical axes of said measuring optical system of said X interferometer, said reference optical system of said X interferometer, said measuring Optical system of said Y interferometer, and said reference optical system of said Y interferometer respectively.

12. A high precision coordinate measuring device according to claim 11, further comprising:
a Z reflecting mirror fixed to said base on a plane perpendicular to a Z axis, and
a Z interferometer fixed to said movable holder, for measuring relative location thereof in reference to said Z reflecting mirror;
wherein said movable holder is displaceable in a direction along the Z axis, and an optical axis of said Z interferometer coincides with an optical axis of said position detector.

13. A high precision coordinate measuring device according to claim 12, wherein said Z interferometer has a measuring optical system and a reference optical system, said measuring optical system of said Z interferometer has a measuring optical path allowing a light beam to reciprocally travel N(z) times, where N(z) is an integer having a value of 2 or larger, between the Z interferometer and said Z reflecting mirror, said reference optical system of said Z interferometer has a reference optical path allowing a light beam to reciprocally travel M(z) times, where M(z) is an integer smaller than N(z), between the Z interferometer and said Z reflecting mirror, and said measuring optical system and said reference optical system of said Z interferometer are positioned so as to satisfy the following condition:

$$N(z)L(z) = M(z)D(z)$$

where the reference symbol L(z) represents a distance from the point to be measured to an optical axis of said measuring optical system of said Z interferometer and the reference symbol D(z) designates a distance from the point to be measured to an optical axis of said reference optical system of said Z interferometer.

14. A high precision coordinate measuring device comprising:
a base,
a first reflecting mirror fixed to said base,
a second reflecting mirror fixed to said base perpendicular to a given axis,
a movable holder disposed so as to be movable relative to said base along said axis,
an optical position detector, which is fixed to said movable holder and includes a light source, an objective lens having a focal length f, and a photodetector detecting light emitted from said light source, transmitted through said objective lens focusing on a point to be measured on an object, reflected at said object, transmitted through said objective lens again and reflected at said first reflecting mirror, and
an interferometer optical system fixed to said movable holder at a distance 2 f from said point to be measured on said object, for measuring a location of said point to be measured relative to said second reflecting mirror.

15. A high precision coordinate measuring device comprising:
- a base,
- a X reflecting mirror fixed to said base on a plane perpendicular to a X axis,
- a Y reflecting mirror fixed to said base on a plane perpendicular to a Y axis,
- a movable holder disposed so as to be movable relative to said base in parallel with said X axis and said Y axis,
- a position detector fixed to said movable holder for detecting a point to be measured,
- a X interferometer optical system including a first interferometer and a second interferometer, fixed to said movable holder in opposite to said X reflecting mirror, for measuring relative displacement between said X reflecting mirror and the point to be measured detected by said position detector, and
- a Y interferometer optical system including a third interferometer and a fourth interferometer, fixed to said movable holder opposite to said Y reflecting mirror, for measuring relative displacement between said Y reflecting mirror and the point to be measured detected by said position detector;
- wherein each of said first to fourth interferometers has a measuring optical system and a reference optical system, the measuring optical systems of said first to fourth interferometers have optical axes located at distances of L(x), D(x), where D(x) does not equal L(x)) L(y), and D(y) where D(y) does not equal L(y), from the point to be measured detected by said position detector respectively, and said measuring device is configured so as to calculate displacement of the point to be measured by the following formulae:

$$S(x) = (d(x)2 - m(x)d(x)1/(1-m(x))$$

$$S(y) = (d(y)2 - m(y)d(y)1/(1-m(y))$$

the reference symbol S(x) represents a value of displacement in a direction along the X axis of said point to be measured, d(x)1 represents a value of displacement in the direction along the X axis of said movable holder as measured with said first interferometer, d(x)2 designates a value of displacement in the direction along the X axis of said movable holder as measured with said second interferometer, m(x) denotes a value of L(x)/D(x), S(y) represents a value of displacement in a direction along the Y axis of said point to be measured, d(y)1 represents a value of displacement in the direction along the Y axis of said movable holder as measured with said third interferometer, d(y)2 designates a value of displacement in the direction along the Y axis of said movable holder as measured with said fourth interferometer and m(y) denotes a value of L(y)/D(y).

16. A high precision coordinate measuring device according to claim 15, further comprising:
- a Z reflecting mirror fixed to said base on a plane perpendicular to a Z axis, and
- a Z interferometer optical system including a fifth interferometer and a sixth interferometer, mounted on said movable holder in opposite to said Z reflecting mirror, for measuring relative displacement between said Z reflecting mirror and the point to be measured detected by said position detector;
- wherein said movable holder is movable relative to said base in parallel with said Z axis, and
- wherein each of said fifth interferometer and said sixth interferometer has a measuring optical system and a reference optical system, the measuring optical system of said fifth interferometer has an optical axis located at a distance of L(z) from the point to be measured detected by said position detector, the measuring optical system of said sixth interferometer has an optical axis located a distance of D(z), where D(z) is not equal to L(z), from said point to be measured, and said measuring device calculates displacement S(z) in a direction along the Z axis of the point to be measured by the following formula:

$$S(z) = (d(z)2 - m(z)1)/(1 - m(z))$$

where the reference symbol d(z)1 represents a value of displacement in the direction along the Z axis of said movable holder as measured with said fifth interferometer, the reference symbol d(z)2 designates a value of displacement in the direction along the Z axis of said movable holder as measured with said sixth interferometer, and the reference symbol m(z) denotes a value of L(z)/D(z).

17. A high precision coordinate measuring device comprising:
- a base,
- an X reflecting mirror fixed to said base on a plane perpendicular to an X axis,
- a Y reflecting mirror fixed to said base on a plane perpendicular to a Y axis,
- a movable holder disposed so as to be movable relative to said base in parallel with said X axis and said Y axis,
- a position detector fixed to said movable holder for detecting a point to be measured,
- an X interferometer optical system including a first interferometer and a second interferometer, fixed to said movable holder opposite to said X reflecting mirror, for measuring relative displacement between said X reflecting mirror and the point to be measured detected by said position detector, and
- a Y interferometer optical system including a third interferometer and a fourth interferometer, fixed to said movable holder opposite to said Y reflecting mirror, for measuring relative displacement between said Y reflecting mirror and the point to be measured detected by said position detector;
- wherein each of said first to fourth interferometers has a measuring optical system and a reference optical system, the measuring optical systems of said first to fourth interferometers have optical axes located at distances of L(x), D(x), where D(x) is not equal to L(x), L(y), and D(y) where D(y) is not equal to L(y), from the point to be measured detected by said position detector respectively, and said measuring device satisfies the conditions below and calculates displacement in a direction along the X axis of the point to be measured from a difference between a number of interference fringes including fractions measured with said first interferometer and another number of interference fringes measured with said second interferometer and displacement in a direction along the Y axis of the point to be measured from a difference between a number of interference fringes including fractions measured with said third interferometer and another number of interference fringes measured with said fourth interferometer:

$$N(x)L(x)=M(x)D(x)$$

$$N(y)L(y)=M(y)D(y)$$

where the reference symbol $N(x)$ represents an integer having a value of at least 2 indicating a number of reciprocal travelling of a measuring light beam for said first interferometer which travels between said X reflecting mirror and the first interferometer, $M(x)$ designates an integer which is smaller than $N(x)$ and indicates a number of reciprocal travelling of a measuring light beam for said second interferometer travelling between said X reflecting mirror and the second interferometer, $N(y)$ represents an integer having a value of at least 2 indicating a number of reciprocal travelling of a measuring light beam for said third interferometer which travels between said Y reflecting mirror and the third interferometer, and $M(y)$ designates an integer which is smaller than $N(y)$ and indicates a number of reciprocal travelling of a measuring light beam for said fourth interferometer travelling between said Y reflecting mirror and the fourth interferometer.

18. A high precision coordinate measuring device according to claim 17, further comprising:
  a Z reflecting mirror fixed to said base on a plane perpendicular to a Z axis, and
  a Z interferometer optical system including a fifth interferometer and a sixth interferometer, mounted on said movable holder opposite to said Z reflecting mirror, for measuring relative displacement between said Z reflecting mirror and the point to be measured detected by said position detector;
  wherein said movable holder is movable relative to said base in parallel with the Z axis, and
  wherein each of said fifth interferometer and said sixth interferometer has a measuring optical system and a reference optical system, the measuring optical system of said fifth interferometer has an optical axis located at a distance of $L(Z)$ from the point to be measured detected by said position detector, the measuring optical system of said sixth interferometer has an optical axis located at a distance of $D(z)$, where $D(z)$ is not equal to $L(z)$, from said point to be measured, and said measuring device satisfies the condition below and calculates displacement in a direction along the Z axis of the point to be measured from a difference between a number of interference fringes including fractions measured with said fifth interferometer and another number of interference fringes measured with said sixth interferometer:

$$N(z)L(z)=M(z)D(z)$$

where the reference symbol $N(z)$ represents an integer having a value of at least 2 indicating a number of reciprocal travelling of a measuring light beam for said fifth interferometer which travels between said Z reflecting mirror and the fifth interferometer, and $M(z)$ designates an integer which is smaller than $N(z)$ and indicates a number of reciprocal travelling of a measuring light beam for said sixth interferometer travelling between said Z reflecting mirror and the sixth interferometer.

* * * * *